US012647674B2

(12) United States Patent
Nakayama

(10) Patent No.: US 12,647,674 B2
(45) Date of Patent: Jun. 2, 2026

(54) ELECTRONIC DEVICE, CONTROL MEANS THEREOF, AND STORAGE MEDIUM FOR REDUCING POWER CONSUMPTION WHEN TRANSITIONING TO A POWER OFF STATE

(71) Applicant: CANON KABUSHIKI KAISHA, Tokyo (JP)

(72) Inventor: Tetsuro Nakayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 343 days.

(21) Appl. No.: 18/302,969

(22) Filed: Apr. 19, 2023

(65) Prior Publication Data

US 2023/0353865 A1     Nov. 2, 2023

(30) Foreign Application Priority Data

Apr. 28, 2022     (JP) ................................. 2022-075436

(51) Int. Cl.
*H04N 23/65* (2023.01)
*H04N 23/62* (2023.01)

(52) U.S. Cl.
CPC ........... *H04N 23/651* (2023.01); *H04N 23/62* (2023.01)

(58) Field of Classification Search
CPC .... H04N 23/651; H04N 23/62; H04N 23/611; H04N 23/65; H04N 23/6812
USPC ....................................................... 348/372
See application file for complete search history.

(56) References Cited

U.S. PATENT DOCUMENTS

| | | | | |
|---|---|---|---|---|
| 6,738,095 | B2 * | 5/2004 | Dibella | G03B 17/38 348/222.1 |
| 9,237,317 | B2 * | 1/2016 | Hollinger | H04N 23/50 |
| 11,300,650 | B2 * | 4/2022 | Glover | G01S 19/46 |
| 2010/0077421 | A1 * | 3/2010 | Cohen | G07C 9/37 348/370 |
| 2011/0074945 | A1 | 3/2011 | Watanabe et al. | |
| 2011/0296217 | A1 | 12/2011 | Nishimura et al. | |

(Continued)

FOREIGN PATENT DOCUMENTS

| | | |
|---|---|---|
| JP | 2003-319221 A | 11/2003 |
| JP | 2011077706 A | 4/2011 |

(Continued)

*Primary Examiner* — Usman A Khan
(74) *Attorney, Agent, or Firm* — Cowan, Liebowitz & Latman, P.C.

(57)     ABSTRACT

An electronic device includes a second control unit configured to determine which of a movement distance of the electronic device and an angle of the electronic device is calculated according to a state of a power supply of the electronic device and a use state that is detected by a use state detector that detects a use state of the electronic device by a user, calculates the movement distance or the angle of the electronic device based on a detection result of the distance/angle detector, and controls the power supply of the electronic device according to the calculation result, and in a case in which the power supply of the electronic device is OFF, the second control unit calculates the angle of the electronic device, and in a case in which the power supply of the electronic device is ON, the second control unit calculates the movement distance in a case in which the use state detector does not detect a state in which the user is using the electronic device.

11 Claims, 5 Drawing Sheets

(56)                    References Cited

U.S. PATENT DOCUMENTS

| 2015/0022704 | A1* | 1/2015 | Fratti | ..................... | H04N 23/64 |
| | | | | | 348/333.01 |
| 2019/0079108 | A1* | 3/2019 | Takahashi | .............. | H04N 7/188 |
| 2019/0230325 | A1* | 7/2019 | Yamada | .................... | G06T 7/70 |

FOREIGN PATENT DOCUMENTS

| JP | 2011-253311 | A | 12/2011 |
| JP | 2013225041 | A | 10/2013 |
| JP | 2015226210 | A | 12/2015 |
| JP | 2021182692 | A | 11/2021 |

* cited by examiner

ELECTRONIC DEVICE, CONTROL MEANS THEREOF, AND STORAGE MEDIUM FOR REDUCING POWER CONSUMPTION WHEN TRANSITIONING TO A POWER OFF STATE

BACKGROUND OF THE INVENTION

Field of the Invention

The present invention relates to the control of a power supply of an electronic device.

Description of the Related Art

When using an electronic device, a user typically turns on the power supply of the electronic device by pressing a power button. However, when a power supply is turned on by pressing a button, there are cases in which the power supply is unintentionally turned on due to an erroneous operation. In order to prevent the power supply from being turned on unintentionally, Japanese Patent Application Laid-Open No. 2011-253311 discloses a KIOSK terminal that uses two detectors to terminate a power-saving mode in a case in which a user approach and a subsequent operation by the user are respectively detected.

In addition, with respect to a transition to power supply OFF, generally, in order to avoid wasteful power consumption, an auto power off function is used to automatically set the power supply of a device to OFF when there has been no operation for a predetermined time. However, the auto power off transition time is often uniform and cannot be said to be optimal in every use case. Japanese Patent Application Laid-Open No. 2003-319221 discloses an image capturing apparatus that detects a gripping state of the image capturing apparatus by two touch sensors, determines a level of image capturing intention of the user in accordance with the gripping state, and determines an auto power off time in accordance with the level of image capturing intention.

However, in the technology of Japanese Patent Application Laid-Open No. 2011-253311, after detecting an operation by the user, the power saving mode is terminated and the terminal is started, and there is a risk that the start-up of the device may not be completed in time in a situation in which an immediate response is required. In the image capturing apparatus of Japanese Patent Application Laid-Open No. 2003-319221, even in a case in which the user does not intend to use the device even though the device is being gripped, the electronic device cannot transition to power supply OFF, resulting in unnecessary power consumption. Furthermore, in Japanese Patent Application Laid-Open No. 2011-253311, there is no technology disclosed for turning off the power supply of an electronic device, and in Japanese Patent Application Laid-Open No. 2003-319221, there is no technology disclosed for turning on the power supply of an electronic device, but only a technology for transitioning the power supply of an electronic device to either ON or OFF, respectively.

SUMMARY OF THE INVENTION

The present invention improves the accuracy of a power supply control of an electronic device.

An electronic device according to the present invention includes a memory storing instructions; and a processor executing the instructions causing the electronic device to: select one of a movement distance of the electronic device or an angle of the electronic device according to a state of a power supply of the electronic device and a use state that was detected by a first detector that detects the use state of the electronic device by a user, and acquire at least the selected one based on a detection result of a second detector; and control the power supply of the electronic device according to the result of the acquisition, wherein in a case in which the power supply of the electronic device is OFF, the processor selects the angle, and wherein in a case in which the power supply of the electronic device is ON, the processor selects the movement distance in a case in which the first detector does not detect a state in which the user is using the electronic device.

Further features of the present invention will become apparent from the following description of exemplary embodiments with reference to the attached drawings.

BRIEF DESCRIPTION OF THE DRAWINGS

FIG. 3 is a flowchart showing a control of the transition from power supply OFF to power supply ON.

DESCRIPTION OF THE EMBODIMENTS

First Embodiment

Figure 1:
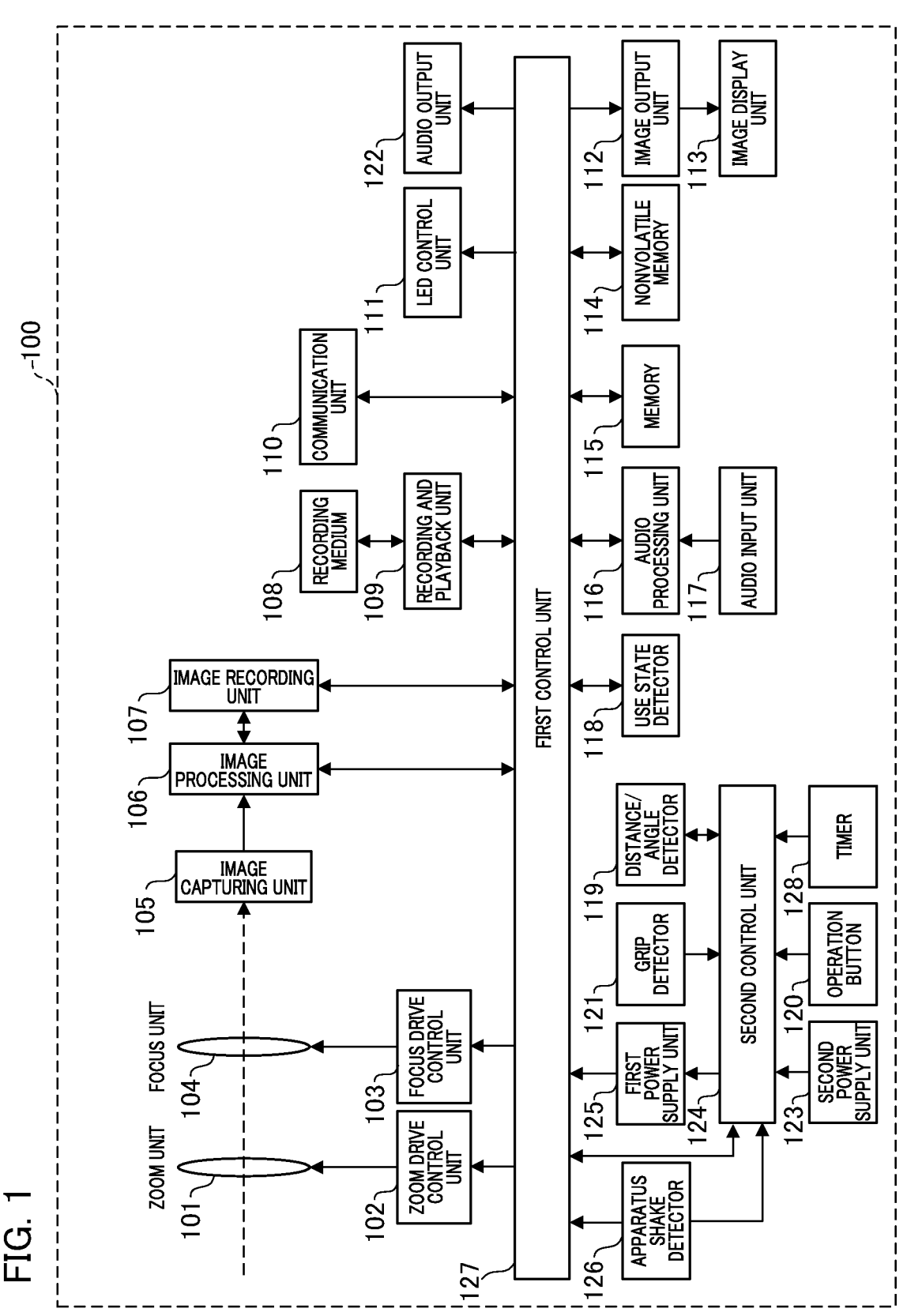
FIG. 1 is a diagram showing a configuration of an electronic device in a first embodiment.

FIG. 1 is a diagram showing a configuration of an electronic device according to a first embodiment. In the present embodiment, an image capturing apparatus 100 is explained as an example of an electronic device, but is not limited thereto. The electronic device may be, for example, a smartphone, a tablet terminal, a head-mounted display for XR, or any other device that requires a control of ON/OFF of a power supply and is used in a state in which it is gripped by a person or device or is temporarily gripped before use.

The image capturing apparatus 100, which is an electronic device, includes a first control unit 127, a zoom unit 101, a zoom drive control unit 102, a focus unit 104, a focus drive control unit 103, an image capturing unit 105, an image processing unit 106, and an image recording unit 107. The image capturing apparatus 100 further includes a recording medium 108, a recording and playback unit 109, a communication unit 110, a light-emitting diode (LED) control unit 111, an audio output unit 122, an image output unit 112, an image display unit 113, a nonvolatile memory 114, a memory 115, an audio processing unit 116, and an audio input unit 117. The image capturing apparatus 100 further includes a use state detector 118, a distance/angle detector 119, a grip detector 121, a first power supply unit 125, a second power supply unit 123, an operation button 120, a second control unit 124, and an apparatus shake detector 126.

The first control unit 127 controls the image capturing apparatus 100 overall. The first control unit 127 includes, for example, a processor and a memory that functions as a work area. The processor is a Central Processing Unit (CPU), a Graphics Processing Unit (GPU), a microprocessor, a Micro-Processing Unit (MPU), or the like. The memory is a Dynamic Random Access Memory (DRAM), a Static Random Access Memory (SRAM), or the like. By executing a program that is stored in the nonvolatile memory 114 or the like, the first control unit 127 performs various processing so as to control each block of the image capturing apparatus 100, or to control data transfer between each block by executing each process. The nonvolatile memory 114 is an electrically erasable and recordable memory, such as an electrically erasable programmable read-only memory (EE-PROM). Operational constants, programs, and the like of the first control unit 127 are stored in the nonvolatile memory 114.

The image capturing apparatus 100 includes an image capturing optical system, and the image capturing optical system includes a zoom unit 101 and a focus unit 104. The zoom unit 101 includes a zoom lens for performing variable magnification. The focus unit 104 includes a lens for performing focus adjustment. Based on an instruction from the first control unit 127, the zoom drive control unit 102 drives and controls the zoom unit 101, and the focus drive control unit 103 drives and controls the focus unit 104.

The image capturing unit 105 is provided with an image capturing element and a signal processing unit that performs A/D conversion. The image capturing element receives light incident through each lens group of the image capturing optical system, and outputs a charge corresponding to the amount of light received to the signal processing unit by converting the charge into an electric signal by photoelectric conversion. The signal processing unit outputs the electric signal to the image processing unit 106 as digital image data by performing analog-to-digital (A/D) conversion. The image processing unit 106 applies image processing such as distortion correction, white balance adjustment, and color interpolation to the digital image data, and outputs the processed digital image data. The digital image data that is output from the image processing unit 106 is converted by the image recording unit 107 into a recording format type, such as JPEG format, and is transmitted to the memory 115, the image output unit 112, the image display unit 113, or the like.

The audio input unit 117 acquires an audio signal from around the image capturing apparatus 100 by a microphone provided in the image capturing apparatus 100, performs analog-to-digital conversion on the audio signal, and transmits the signal to the audio processing unit 116. The audio processing unit 116 performs audio-related processing, such as optimization processing of the input digital audio signal. Then, the audio signal that is processed by the audio processing unit 116 is transmitted to the memory 115 by the first control unit 127.

The memory 115 temporarily saves the image signal and the audio signal obtained from the image processing unit 106 and the audio processing unit 116. The image processing unit 106 and the audio processing unit 116 read the image signal and the audio signal temporarily stored in the memory 115, and perform encoding on the image signal and the audio signal to generate a compressed image signal and a compressed audio signal. The first control unit 127 transmits the compressed image signal and the compressed audio signal to the recording and playback unit 109.

The recording and playback unit 109 records various types of data such as image data and audio data on the recording medium 108. Specifically, the recording and playback unit 109 records the compressed image signal and the compressed audio signal that was generated by the image processing unit 106 and the audio processing unit 116 and other control data related to image capturing on the recording medium 108. In addition, in a case in which the audio signal is not compressed and encoded, the first control unit 127 records the audio signal that was generated by the audio processing unit 116 and the compressed image signal that was generated by the image processing unit 106 on the recording medium 108 via the recording and playback unit 109.

The recording medium 108 may be a recording medium incorporated in the image capturing apparatus 100 or may be a removable recording medium. The recording medium 108 can record various data, such as the compressed image signal, the compressed audio signal, and the audio signal that has been generated in the image capturing apparatus 100, and a medium having a capacity larger than that of the nonvolatile memory 114 is generally used as the recording medium 108. For example, the recording medium 108 includes any type of recording media, such as a hard disk, an optical disk, a magneto-optical disk, a compact disk record-able (CD-R), a digital versatile disc recordable (DVD-R), a magnetic tape, a non-volatile semiconductor memory, and a flash memory.

Furthermore, the recording and playback unit 109 reads (reproduces) the compressed image signal, the compressed audio signal, the audio signal, and various data that is stored on the recording medium 108. Then, the first control unit 127 transmits the read compressed image signal and the compressed audio signal to the image processing unit 106 and the audio processing unit 116. The image processing unit 106 and the audio processing unit 116 temporarily store the compressed image signal and compressed audio signal in the memory 115, decode the signal according to a predetermined procedure, and transmit the decoded signal to the image output unit 112.

The image output unit 112 transmits the image signal and the like to cause the connected image display unit 113 to display the image. The image output unit 112 includes, for example, an image output terminal. It should be noted that the audio output unit 122 and the image output unit 112 may be a single integrated terminal, for example, a High-Definition Multimedia Interface (HDMI) terminal. The image display unit 113 displays the image signal and various information output by the image output unit 112. The image display unit 113 is, for example, a display device (monitor) such as an LCD (liquid crystal display) or an EVF (electronic viewfinder).

The audio output unit 122 includes a speaker, and outputs a preset audio pattern of the audio incorporated in the image capturing apparatus 100, for example, during image capturing and the like. The LED control unit 111 controls an LED (Liht Emitting Diode) provided to the image capturing apparatus 100. The LED control unit 111 controls the LED based on a preset lighting pattern or blinking pattern, for example, during image capturing and the like.

The communication unit 110 performs communication between the image capturing apparatus 100 and an external apparatus. The communication unit 110, for example, transmits or receives data such as an audio signal, an image signal, a compressed audio signal, or a compressed image signal. In addition, the communication unit 110 receives and outputs to the first control unit 127 a control signal related to image capturing, such as image capturing start and end commands, zoom drive, and the like. Thereby, the image capturing apparatus 100 can be driven based on an instruction from an external device. The communication unit 110 includes a wireless communication module, for example, an infrared communication module, a Bluetooth communication module, a wireless LAN communication module, or a wireless Universal Serial Bus (USB), and the like.

The second control unit 124 is a control unit provided separately from the first control unit 127 that controls the entire camera system, and is configured to control the power supplied to the first control unit 127. The second control unit 124 may, for example, have a processor and a memory that functions as a work area, or it may be a circuit configured to perform power supply control, as described below. The first power supply unit 125 and the second power supply unit 123 supply power to operate the first control unit 127 and the second control unit 124, respectively. When power is supplied from a battery, an adapter, a USB, and the like, the second power supply unit 123 is always in the ON state, and supplies power to the second control unit 124. The second control unit 124 is always in an operating state when power is supplied to the second power supply unit 123, and functions as a power control unit that controls the startup state of the first control unit 127, that is, the entire image capturing apparatus 100, by controlling the ON/OFF state of the first power supply unit 125. The first power supply unit 125 is started based on the start-up determination result of the second control unit 124, and supplies power to the first control unit 127.

Information from the distance/angle detector 119, the apparatus shake detector 126, the grip detector 121, the use state detector 118, the operation button 120, and a timer 128 is input, either directly or via the first control unit 127, to the second control unit 124. Information from the distance/angle detector 119, the apparatus shake detector 126, the grip detector 121, the operation button 120, and the timer 128 is input to the second control unit 124 even while the first control unit 127 is not operating. The second control unit 124 performs a determination as to whether or not to activate the first control unit 127 based on various input information. In a case in which it is determined that the first control unit 127 is to be started, the second control unit 124 instructs the first power supply unit 125 to supply power to the first control unit 127. Furthermore, in addition to turning the power supply of the image capturing apparatus 100 ON/OFF, the second control unit 124 also performs control so as to put the image capturing apparatus 100 into a sleep state. The sleep state is a state of reduced consumption of power in which some functions of the image capturing apparatus 100, such as the display of an image by the image display unit 113, are stopped so as to reduce power consumption.

The grip detector 121 detects the gripping state (presence or absence of gripping) of the image capturing apparatus 100 by the user and outputs a detection signal to the second control unit 124. The grip detector 121 includes, for example, a piezoelectric film sensor (pressure sensor), and outputs a detection signal corresponding to the pressure to the second control unit 124 by detecting the pressing (pressing contact) of the hand of the user. It should be noted that the grip detector 121 may be capable of detecting that the user has gripped the image capturing apparatus 100, and may be a piezoelectric sensor, a capacitance sensor, or a proximity sensor. The second control unit 124, for example, in a case in which a grip detection signal is input from the grip detector 121, determines that the image capturing apparatus 100 is gripped by the user, and in a case in which no grip detection signal is input from the grip detector 121, determines that the image capturing apparatus 100 is not gripped.

The use state detector 118 (first detector) detects the presence or absence of use of the image capturing apparatus 100 by the user. The use state detector 118 is, for example, an eyepiece sensor, a proximity sensor, an in-camera, or the like installed near the image display unit 113. An eyepiece sensor detects that the eyes of a user are near the image display unit 113. The proximity sensor detects that at least one of the eyes, the face, or the body of the user is in close proximity to the image display unit 113. The in-camera detects the close proximity of the user to the image display unit 113 by capturing the eyes, the face, the body, or the movement of the user. When the use state detector 118 detects that the user is in close proximity, the use state detector 118 outputs a detection signal to the second control unit 124 via the first control unit 127. The second control unit 124 determines that the user is using the image capturing apparatus 100 in a case in which there is a detection signal from the use state detector 118. In contrast, the second control unit 124 determines that the user is not using the image capturing apparatus 100 in a case in which there is no detection signal from the use state detector 118.

The distance/angle detector 119 (second detector) detects a value that is used for calculating the position and orientation, the angle, the distance traveled (shift amount), and the like of the image capturing apparatus, and outputs the value to the second control unit 124. The distance/angle detector 119 is, for example, an acceleration sensor that detects acceleration in the three axial directions. In addition the distance/angle detector 119 may be a combination of an acceleration sensor and a gyro sensor that detects the three-axis angular velocities of the image capturing apparatus 100. The second control unit 124 functions as an acquisition unit for acquiring, from the output of the distance/angle detector 119, the movement distance of the image capturing apparatus 100, and the angle formed by the optical axis of the image capturing apparatus 100 and the horizontal plane.

The apparatus shake detector 126 detects the shift amount, or the like, of the apparatus based on the signal output from the distance/angle detector 119. The detection result by the apparatus shake detector 126 is used, for example, for image blur correction by the first control unit 127. The operation button 120 includes various buttons, such as a power supply button. The second control unit 124, in addition to a power supply control described below, controls the ON/OFF of the power supply of the image capturing apparatus 100 based on the operation of the user with respect to the power supply button of the operation button 120. The timer 128 measures the elapsed time from the time reset by the second control unit 124, and outputs the measurement results to the second control unit 124. The second control unit 124, for example, may put the image capturing apparatus 100 into a sleep state or power supply OFF state in a case in which no operation is performed by the user for a predetermined time or longer, based on the measurement results of the timer 128.

Overview of a Transition from Power Supply OFF to Power Supply ON

Figure 2A:
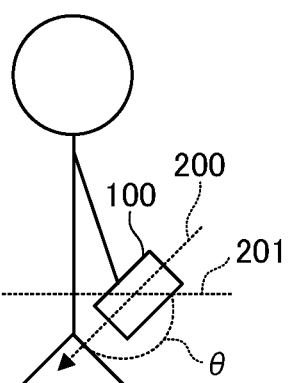
FIGS. 2A to 2E are diagrams explaining a state in which the electronic device is used.
Figure 2B:
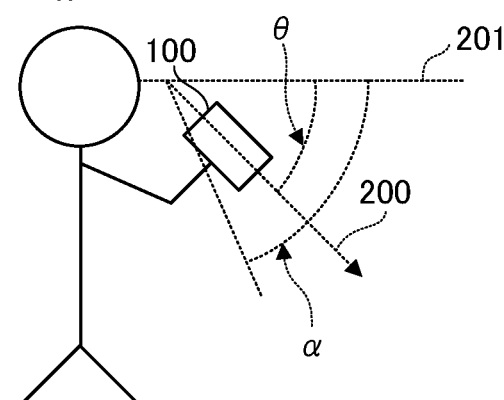

FIGS. 2A to 2E are diagrams explaining a state in which the user uses the image capturing apparatus 100 that is an electronic device. First, the conditions under which the second control unit 124 controls the first power supply unit 125 from OFF to ON will be explained with reference to FIG. 2A and FIG. 2B. FIG. 2A and FIG. 2B are diagrams that show the action of a user from a state in which the image capturing apparatus 100 is not being used to a state in which the image capturing apparatus 100 transitions to a state in which it is in use. Note that in the following description, "power supply" refers to the "first power supply unit 125".

As shown in FIG. 2A, when the user grips the power supply OFF image capturing apparatus 100, the grip detector 121 detects the grip and outputs a detection signal to the second control unit 124. When the detection signal is input from the grip detector 121, the second control unit 124 causes the distance/angle detector 119 to start the detection of acceleration of the three axes of the image capturing apparatus 100. Then, the second control unit 124 calculates an angle θ formed by a horizontal plane 201 and an optical axis 200 of the image capturing apparatus 100 based on the output of the distance/angle detector 119. As the user lifts the image capturing apparatus 100, the angle θ gradually approaches 0°. The second control unit 124 transitions the power supply of the image capturing apparatus 100 from OFF to ON in a case in which the angle θ formed by the horizontal plane 201 and the optical axis 200 of the image capturing apparatus 100 has become less than a predetermined angle (angle threshold value α). For example, in a case in which the angle threshold value is set to be 60°, if the angle θ is below the angle threshold value α, as shown in FIG. 2B, the power supply of the image capturing apparatus 100 transitions from OFF to ON. Note that the angle threshold value α is not limited to 60°, but may be any other angle, such as 45° or 80°. Note that in the present embodiment, although an example of calculating and acquiring an angle formed by the horizontal plane and the optical axis of the image capturing apparatus 100 has been explained, it is not limited thereto. For example, it is possible to determine whether the user is about to start using the image capturing apparatus 100 by calculating the position and orientation of the image capturing apparatus 100 in the XYZ axis directions and making a comparison with a reference position and orientation. Thus, in the transition from power supply OFF to power supply ON, among the movement distance and angle that can be detected by the distance/angle detector 119, it is determined whether or not to transition to power supply ON by selecting the angle. Thereby, because it is possible to determine whether or not to transition to power supply ON with a high degree of accuracy, the transition to power supply ON can be performed with a high responsiveness to the operation of the user attempting to start use.

Overview of a Transition from Power Supply ON to Power Supply OFF

Figure 2C:
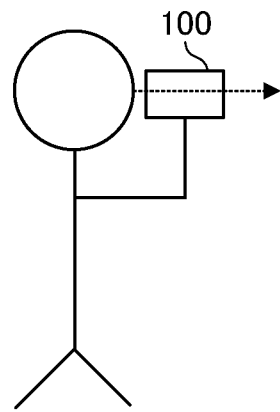
Figure 2D:
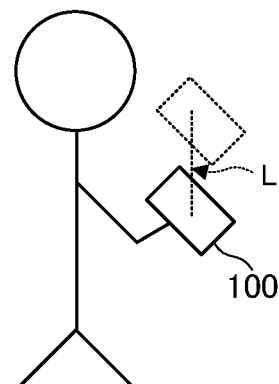

Next, a condition in which the second control unit 124 controls the first power supply unit 125 from ON to OFF will be explained with reference to FIG. 2C and FIG. 2D. FIG. 2C and FIG. 2D are diagrams that show the action of a user from a state in which the image capturing apparatus 100 is in use to a state in which the image capturing apparatus 100 transitions to a state in which it is not in use. FIG. 2C shows a user using the image capturing apparatus 100, and the user is performing image capturing while looking at the image display unit 113 of the image capturing apparatus 100. The face of the user during image capturing is near the image display unit 113, and the use state detector 118 outputs a detection signal to the second control unit 124 by detecting the face of the user. When the user stops using the image capturing apparatus 100 and lowers the camera, the state of FIG. 2C transitions to the state of FIG. 2D. When the user withdraws their face from the image capturing apparatus 100, the detection signal from the use state detector 118 that was input to the second control unit 124 changes from present to absent. When a detection signal from the use state detector 118 is no longer acquired, the second control unit

124 switches the calculation performed based on the output of the distance/angle detector 119 from an angle to a distance.

After switching the calculation from an angle to a distance, the second control unit 124 transitions the power supply of the image capturing apparatus 100 from ON to OFF in a case in which the image capturing apparatus 100 is no longer gripped, that is, in a case in which a detection signal that has detected gripping from the grip detector 121 is no longer input. In addition, even in a case in which the image capturing apparatus 100 is being gripped, in a case in which the image capturing apparatus 100 has moved a predetermined distance or more from a time point when the detection signal of the use state detector 118 changed from present to absent, the second control unit 124 transitions the power supply of the image capturing apparatus 100 from ON to OFF. Furthermore, even in a case in which the image capturing apparatus 100 is being gripped and the movement distance from the image capturing state is less than a predetermined distance, the second control unit 124 transitions the power supply of the image capturing apparatus 100 from ON to OFF in a case in which a predetermined time has elapsed since the user last operated the image capturing apparatus 100.

Figure 2E:
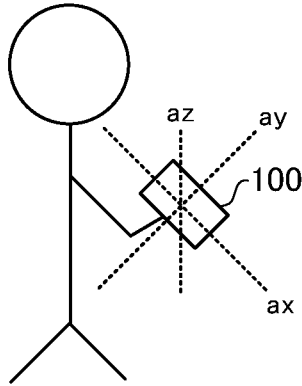

Here, the acquisition of the movement distance of the image capturing apparatus 100 will be explained with reference to FIG. 2E. The movement distance of the image capturing apparatus 100 is the sum of the output of the three axes of the distance/angle detector 119. The output of the acceleration of the three axes by the distance/angle detector 119 is denoted by $a_x$, $a_y$, and $a_z$. The movement distance of the image capturing apparatus 100 from the location at the time point when the detection signal of the use state detector 118 changed from "present" to "absent" is denoted by L, and the X component, Y component, and Z component of L when L is decomposed into the X-axis, Y-axis, and Z-axis, respectively, are denoted Lx, Ly, and Lz. The elapsed time from the time point when the detection signal of the use state detector 118 changed from "present" to "absent" is denoted by T. The movement distance L of the image capturing apparatus 100 is expressed by the below-described Formula (1) to Formula (4).

$$L_x = \int_0^T \int_0^T a_x dt\, dt \tag{1}$$

$$L_y = \int_0^T \int_0^T a_y dt\, dt \tag{2}$$

$$L_z = \int_0^T \int_0^T a_z dt\, dt \tag{3}$$

$$L = \sqrt{L_x^2 + L_y^2 + L_z^2} \tag{4}$$

In a case in which the movement distance L exceeds a predetermined distance threshold value, the second control unit 124 determines that the user is not using the image capturing apparatus 100 and transitions the image capturing apparatus 100 to power supply OFF. It should be noted that although an example of calculating and acquiring a movement distance of the three axes was explained in the present embodiment, this example is not limited thereto, and for example, the movement distance of one axis, such as only the Y-axis, or two axes may be calculated and used in the determination. In this manner, in a transition from power supply ON to power supply OFF, among a movement distance and an angle that can be detected by the distance/ angle detector 119, whether or not to transition to power supply OFF is determined by selecting the movement distance. Thereby, it is possible to determine with a high degree of accuracy whether or not to transition the power supply to OFF, thereby reducing the power consumption caused by leaving the power supply ON despite the image capturing apparatus not being used.

Next, the processing of the second control unit 124 for controlling the first power supply unit 125 will be explained with reference to FIG. 3 and FIG. 4.

Sequence of Transition from Power Supply OFF to Power Supply ON

Figure 3:
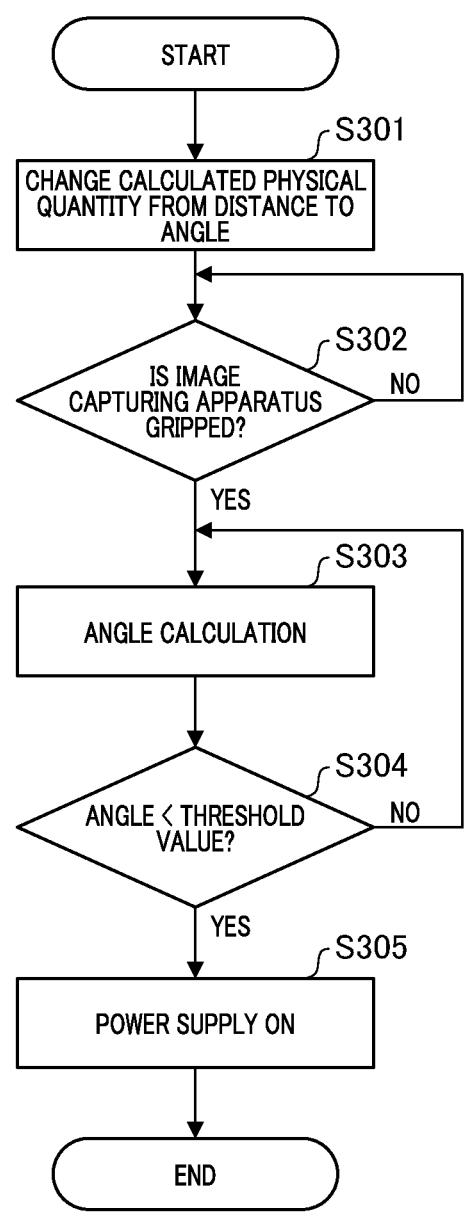

FIG. 3 is a flowchart showing a control of the transition from power supply OFF to power supply ON. When the first power supply 125 of the image capturing apparatus 100 transitions from ON to OFF, the processing shown in FIG. 3 is started.

In a state in which the power supply of the image capturing apparatus 100 is OFF, in step S301, the second control unit 124 changes the physical quantity that is calculated from the output of the distance/angle detector 119 from a distance to an angle. In step S302, the second control unit 124 determines whether or not the image capturing apparatus 100 is gripped by the user. The second control unit 124 determines whether or not the image capturing apparatus 100 is gripped by the user based on the output from the grip detector 121. For example, in a case in which a detection signal is output from the grip detector 121, the image capturing apparatus 100 is determined to have been gripped by the user, and the processing in step S303 is performed. In contrast, in a case in which no detection signal is output from the grip detector 121, it is determined that the user is not gripping the image capturing apparatus 100, and the processing of step S302 is repeated.

In step S303, the second control unit 124 calculates and acquires an angle θ formed by the optical axis of the image capturing apparatus 100 and the horizontal plane, based on the output of the distance/angle detector 119. In step S304, the second control unit 124 determines whether or not the angle θ, which is the calculation result of step S303, is less than a predetermined angle (angle threshold value α). In the case in which the angle θ is less than a predetermined angle, this is treated as the user having the intention to use the image capturing apparatus 100, and the processing of step 305 is carried out. In contrast, in a case in which the angle θ is equal to or greater than the predetermined angle, the processing of step S303 and step S304 is repeated. In step S305, the second control unit 124 turns ON the power supply of the first power supply unit 125.

Sequence of the Transition from Power Supply ON to Power Supply OFF

Figure 4:
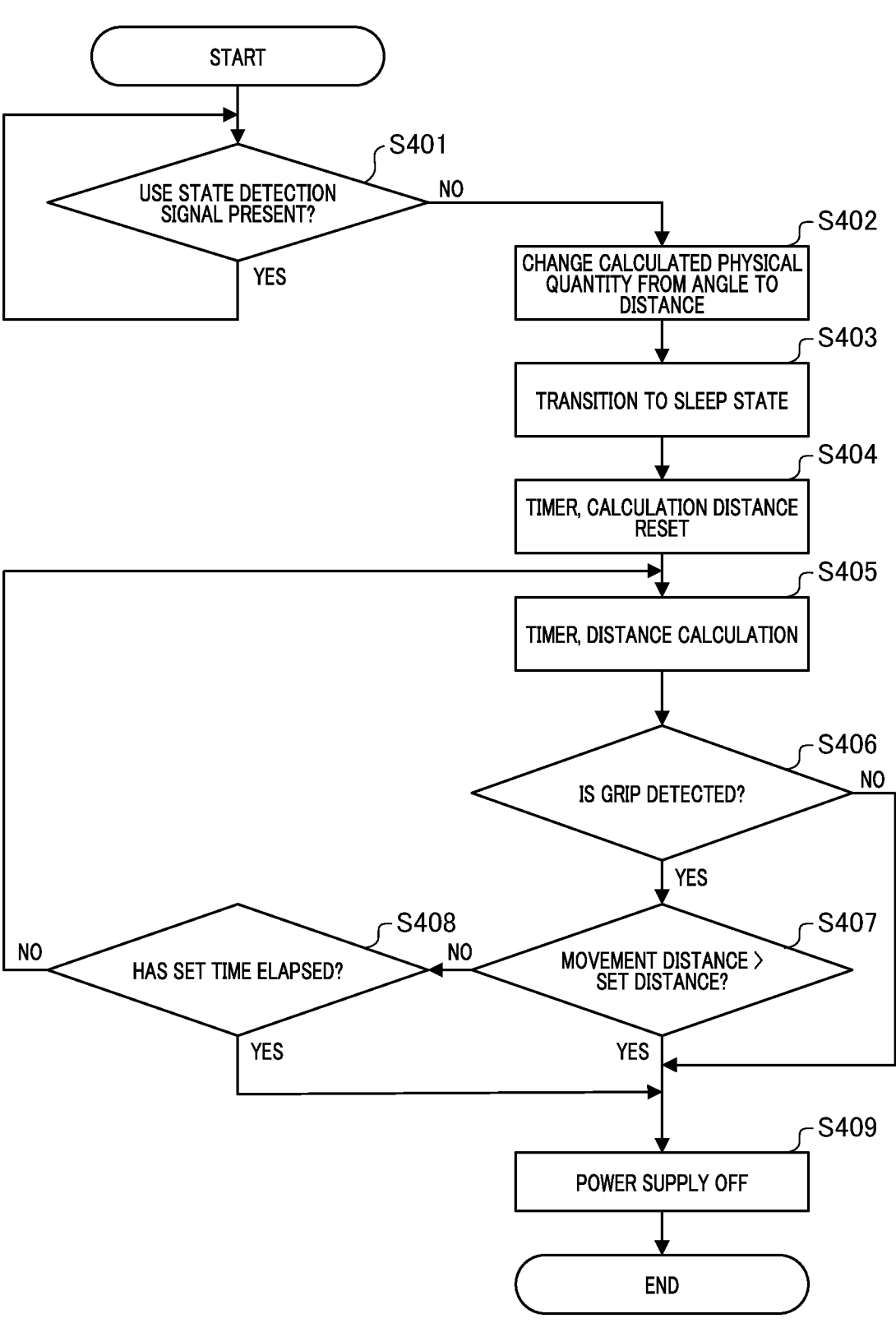
FIG. 4 is a flowchart showing a control of the transition from power supply ON to power supply OFF.

FIG. 4 is a flowchart showing a control of the transition from power supply ON to power supply OFF. When the first power supply 125 of the image capturing apparatus 100 transitions from OFF to ON, the processing shown in FIG. 4 is started. In step S401, in a state in which the power supply of the image capturing apparatus 100 is ON, the second control unit 124 determines the use state of the image capturing apparatus 100 based on the output from the use state detector 118. The use state detector 118 is, for example, an eyepiece sensor, and can detect whether or not the eye of the user is approaching the viewfinder unit having an EVF, and outputs a detection signal to the second control unit 124 when it is detected that the eye of the user has approached. In a case in which there is a detection signal from the use state detector 118, the second control unit 124 determines that the user is using the image capturing apparatus 100, and repeats the process in step S401. In contrast, in a case in which there is no detection signal from the use state detector 118, the second control unit 124 performs the processing of step S402. It should be noted that in the present embodiment, the determination by step S401 is an interrupt process, but it may be a polling process.

In step S402, the second control unit 124 changes the physical quantity that is calculated from the output of the distance/angle detector 119 from an angle to a distance. Next, in step S403, the second control unit 124 instructs the first control unit 127 to put the image capturing apparatus 100 into a sleep state. The sleep state is a state in which some functions of the image capturing apparatus 100, such as the display of an image by the image display unit 113, are stopped so as to reduce power consumption.

In step S404, the second control unit 124 performs a reset of the timer 128 and the movement distance L. It should be noted that the processing of step S402 to step S404 may be performed in parallel. Then, in step S405, the second control unit 124 performs an elapsed time measurement by timer 128 and a calculation of the movement distance L of the image capturing apparatus 100. Here, the movement distance L of the image capturing apparatus 100 is the movement distance of the image capturing apparatus 100 from the location of the time point when the detection signal of the use state detector 118 is detected to have changed from "present" to "absent", and as shown in Formula (1) to Formula (4), the output signal from the distance/angle detector 119 is integrated twice.

In step S406, the second control unit 124 determines whether or not the user is gripping the image capturing apparatus 100 based on the output from the grip detector 121. While detecting the grip of the image capturing apparatus 100 by the user, the grip detector 121 outputs a detection signal to the second control unit 124. The second control unit 124 performs the processing of step S407 in a case in which there is a detection signal from the grip detector 121. In contrast, the second control unit 124 performs the processing of step S409 in a case in which there is no detection signal from the grip detector 121.

In step S409, the second control unit 124 turns off the first power supply unit 125 of the image capturing apparatus 100. This is because in a case in which there is no detection signal from the grip detector 121, that is, the user has let go of the image capturing apparatus 100, it can be determined that the user has no intention of using the image capturing apparatus 100.

In step S407, the second control unit 124 determines whether or not the movement distance L of the image capturing apparatus 100, which is the calculation result of step S405, has become equal to or greater than a predetermined distance threshold value. The second control unit 124 performs processing in step S409 to set the power supply of the image capturing apparatus 100 to OFF in a case in which the movement distance L has become equal to or greater than a predetermined distance threshold value. This is because when the movement distance L of the image capturing apparatus 100 exceeds the distance threshold value after there is no longer a signal from the use state detector 118, the intention to use the image capturing apparatus 100 can be considered to have ceased to exist. In contrast, the second control unit 124 performs the processing of step S408 in a case in which the movement distance L is less than a predetermined distance threshold value.

In step S408, the second control unit 124 determines whether or not the measurement time of the timer 128 after the absence of the signal from the use state detector 118 has exceeded a predetermined set time. In a case in which the measurement time of timer 128 has exceeded the predetermined set time, the second control unit 124 performs the processing of step S409 and sets the power supply of the image capturing unit 100 to OFF. In contrast, in a case in which the measured time of timer 128 has not exceeded the predetermined set time, the second control unit 124 returns to the processing of step S405.

As described above, the optimum control of power supply ON and OFF can be performed by switching the physical quantity that is calculated based on the output of the distance/angle detector 119 to either an angle or a distance. When the power supply is OFF, although grip detection alone may cause the power supply to turn ON when a person bumps into the image capturing apparatus 100, it is possible to suppress an inadvertent transition to power supply ON by combining grip detection with angle detection. In addition, although there is a time when the user cannot use the image capturing apparatus 100 in the method of turning the power supply of the image capturing apparatus 100 ON after lifting, by turning the power supply of the image capturing apparatus 100 ON while lifting the image capturing apparatus 100, it can be used when desired to be used, and it possible to respond to a situation in which responsiveness is required. In addition, at the time of power supply OFF, it is possible to detect the intent of not using the electronic device from the presence or absence of user proximity to the electronic device and the movement distance of the electronic device, and quickly transition the electronic device to power supply OFF, thereby enabling the reduction of wasteful power consumption that would have been required to transition the electronic device to power supply OFF. Furthermore, in the present embodiment, the control for the transition to each of the power supply ON and power supply OFF of the electronic device can be processed in a common configuration without changing the configuration of the internal configuration of the electronic device.

Second Embodiment

Figure 5:
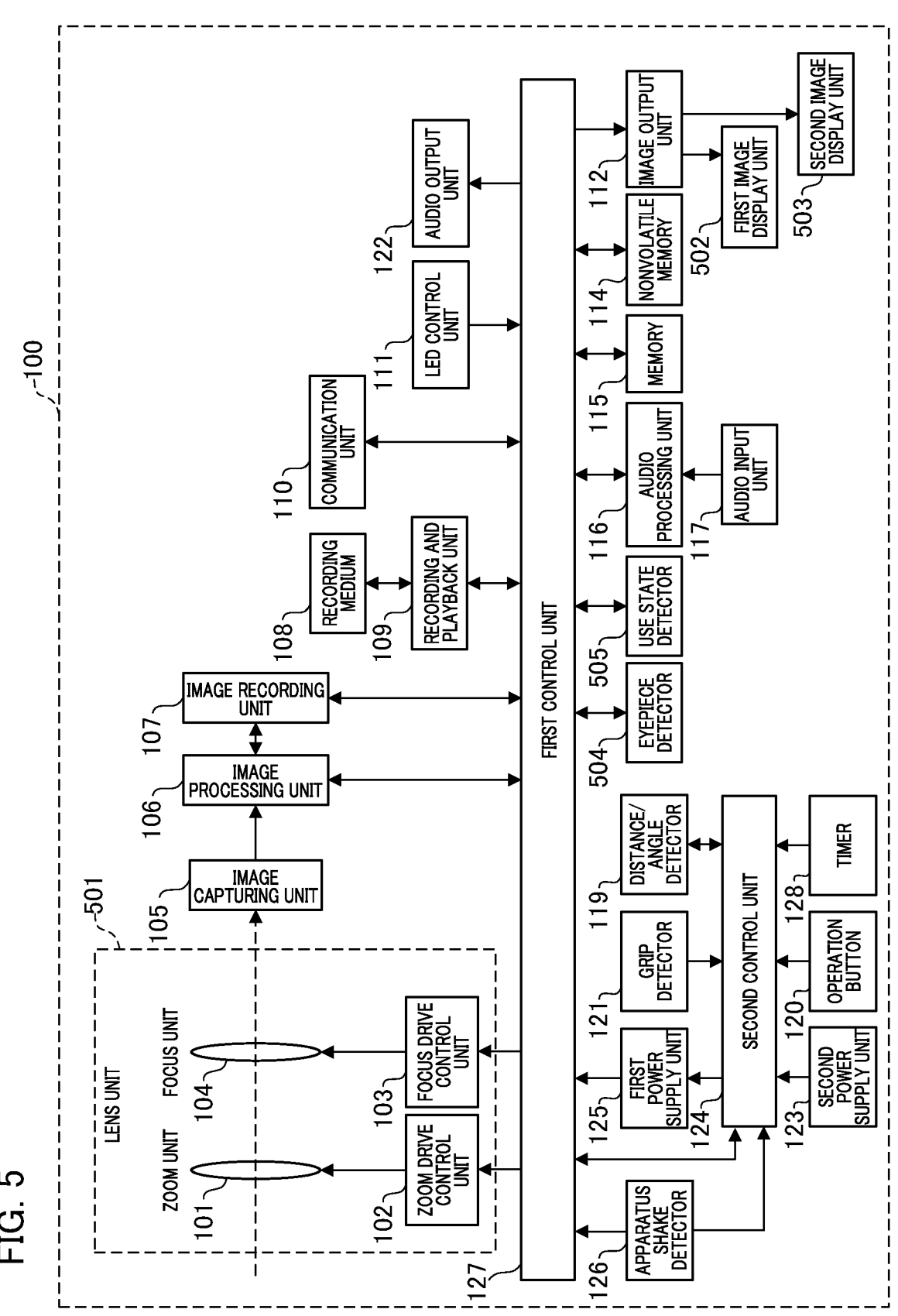
FIG. 5 is a diagram showing a configuration of the electronic device according to a second embodiment

FIG. 5 is a diagram showing a configuration of the electronic device according to a second embodiment. Hereinafter, only configurations that differ from those of the first embodiment will be described. Although the first embodiment explains an example in which a main body portion of an image capturing apparatus provided with an image capturing element and a lens unit provided with an image capturing optical system are integrated, the lens unit may be configured to be attachable to and detachable from the main body portion of the image capturing apparatus. The lens unit 501 includes a zoom unit 101, a zoom drive control unit 102, a focus drive control unit 103, and a focus unit 104, and is detachable from the main body portion of an image capturing apparatus 500.

The image capturing apparatus 500 may include a plurality of display units. The image capturing apparatus 500 includes a first image display unit 502 and a second image display unit 503, and for example, the first image display unit 502 is an EVF and the second image display unit 503 is a monitor such as an LCD. In addition, in a case in which there are plurality of display units, a detector may be provided to detect the use state of the user corresponding to each display unit. The image capturing apparatus 500 includes an eyepiece detector 504 and a use state detector 505. The eyepiece detector 504 is installed near the first image display unit 502 and detects that an eye of the user has approached the first image display unit 502. The eyepiece detector 504 is, for example, a proximity sensor. The use state detector 505 is installed near the second image display unit 503, and detects the use state of the image capturing apparatus 500 by the user. The use state detector 505 is, for example, an in-camera, an infrared dot projector, an infrared camera, a motion detection sensor, or a combination thereof. The eyepiece detector 504 and the use state detector 505 output a use state detection signal to the second control unit 124 in a case in which the proximity of a user is detected in a similar manner to the use state detector 118 of the first embodiment, that is, in a case in which the user is using the image capturing apparatus 500. The second control unit 124 carries out the determination of the step S401 based on the detection result of the use state of the user by the eyepiece detector 504 and the use state detector 505. Thereby, even in a case in which a user is capturing an image while looking through the viewfinder or is capturing a live-view image while looking at a monitor, it is possible to determine whether or not the user is using the image capturing apparatus 500.

As explained above, in an electronic device, it is possible to prevent an inadvertent transition to power supply ON, and to transition to power ON with a high responsiveness at the time of power supply ON. In addition, at the time of power supply OFF, it is possible to detect the intent of not using the electronic device from the presence or absence of user proximity to the electronic device and the movement distance of the electronic device, and quickly transition the electronic device to power supply OFF, thereby enabling the reduction of wasteful power consumption that would have been required to transition the electronic device to power supply OFF. Furthermore, in the present embodiment, the control for the transition to each to the power supply ON and power supply OFF of the electronic device can be processed in a common configuration without changing the configuration of the internal configuration of the electronic device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075436, filed Apr. 28 2022, which is hereby incorporated by reference wherein in its entirety.

What is claimed is:

1. An electronic device comprising:
an imaging unit configured to capture image data; and
at least one processor configured to function as
a control unit configured to
control a power state of the electronic device between an ON state, in which image capture is enabled, and an OFF state, in which image capture is disabled,
wherein the control unit is configured to control the power supply of the electronic device from the OFF state to the ON state, in a case where an angle of the electronic device defined between a horizontal plane and an optical axis of the imaging unit is less than a predetermined angle,
wherein the control unit is configured to control the power supply of the electronic device from the ON state to the OFF state, in a case where the movement distance of the electronic device is greater than or equal to a predetermined distance.

2. The electronic device according to claim 1,
wherein the control unit configured to control the power state of the electronic device between an ON state and an OFF state, when a gripping state of the electronic device by a user is detected.

3. The electronic device according to claim 2, wherein the control unit does not performs control the power state of the electronic device between an ON state and an OFF state, in a case in which gripping state of the electronic device is not detected.

4. The electronic device according to claim 2, further comprising a sensor including at least one of a pressure sensing sensor or a proximity sensor, by which the gripping state is detected.

5. The electronic device according to claim 1, the control unit controls the power supply of the electronic device from the ON state to the OFF state, in a case where there has been no operation of the electronic device for a predetermined period of time or longer, regardless of the movement distance.

6. The electronic device according to claim 1, the movement distance is stated to be detected from a time point corresponding to a state in which a user is no longer using the electronic device.

7. The electronic device according to claim 1, further comprising an acceleration sensor based on which the angle and the moving distance is detected.

8. The electronic device according to claim 6, further comprising a proximity detection unit configured to detect proximity of an eye or the face of the user to a display of the electronic device, based on which whether a user is using the electronic device or not is detected.

9. The electronic device according to claim 1, wherein the electronic device is an image capturing apparatus.

10. A method of controlling an electronic device, the method comprising:
capturing image data;
controlling the power state of the electronic device between an ON state, in which image capture is enabled, and an OFF state, in which image capture is disabled;
controlling the power supply of the electronic device from the OFF state to the ON state, in a case where an angle of the electronic device defined between a horizontal plane and an optical axis of the imaging unit is less than a predetermined angle,
and
controlling the power supply of the electronic device from the ON state to the OFF state, in a case where the movement distance of the electronic device is greater than or equal to a predetermined distance.

11. A non-transitory storage medium storing a control program of an electronic device causing a computer to perform each step of a control method of the electronic device, the method comprising:
capturing image data;
controlling the power state of the electronic device between an ON state, in which image capture is enabled, and an OFF state, in which image capture is disabled;
controlling the power supply of the electronic device from the OFF state to the ON state, in a case where an angle of the electronic device defined between a horizontal plane and an optical axis of the imaging unit is less than a predetermined angle,
and
controlling the power supply of the electronic device from the ON state to the OFF state in accordance with the movement distance.

* * * * *